United States Patent
Belehradek, Jr.

(10) Patent No.: US 6,356,467 B1
(45) Date of Patent: Mar. 12, 2002

(54) DC/DC BOOST CONVERTER WITH BYPASS CIRCUITRY

(75) Inventor: Anton Belehradek, Jr., Downers Grove, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 0 days.

(21) Appl. No.: 09/765,858

(22) Filed: Jan. 18, 2001

Related U.S. Application Data (63) Continuation-in-part of application No. 09/410,391, filed on Oct. 1, 1999, now Pat. No. 6,198,257.

(51) Int. Cl.$^7$ ............................................. H02M 3/335
(52) U.S. Cl. ................................................ 363/24; 363/65
(58) Field of Search ........................... 363/15, 16, 17, 363/240, 25, 26, 65, 71

(56) References Cited

U.S. PATENT DOCUMENTS

| | | | |
|---|---|---|---|
| 4,533,986 A | 8/1985 | Jones | 363/17 |
| 4,553,196 A | * 11/1985 | Tokuyama et al. | 363/21 |
| 4,868,730 A | 9/1989 | Ward | 363/21 |
| 5,119,283 A | 6/1992 | Steigerwald et al. | 363/37 |
| 5,289,046 A | 2/1994 | Gregorich et al. | 307/66 |
| 5,323,100 A | * 6/1994 | Iketani | 320/13 |
| 5,508,905 A | 4/1996 | Reichard | 363/71 |
| 5,737,208 A | 4/1998 | Chen | 363/133 |
| 5,861,734 A | 1/1999 | Fasullo et al. | 323/222 |
| 6,134,124 A | * 10/2000 | Jungreis et al. | 363/65 |
| 6,198,257 B1 | 3/2001 | Belehradek et al. | 323/222 |

* cited by examiner

*Primary Examiner*—Jeffrey Sterrett
(74) *Attorney, Agent, or Firm*—Rockey, Milnamow & Katz, Ltd.

(57) ABSTRACT

A system and method for generating an AC power output signal from a DC power input signal. The system incorporates a DC-to-DC boost regulator including a plurality of boost stages coupled in series for receiving a DC input signal and producing a boosted DC power signal. The system further incorporates a DC-to-AC converter coupled to the transformerless DC-to-DC boost regulator, for receiving the boosted DC power signal and generating an AC power output signal. A control element is coupled to both the DC-to-DC boost regulator and the DC-to-AC converter. In at least one embodiment, the system and method for generating an AC power output signal from a DC power input signal are used in connection with an uninterruptible power supply.

18 Claims, 6 Drawing Sheets

DC/DC BOOST CONVERTER WITH BYPASS CIRCUITRY

This is a continuation-in-part of Ser. No. 09/410,391 filed Oct. 1, 1999 now U.S. Pat. No. 6,198,257 and entitled "Transformerless DC-To-AC Power Converter and Method".

FIELD OF THE INVENTION

The invention pertains to a system and method for generating an AC power output signal from a DC power input signal. More specifically, the invention pertains to a DC-to-AC power converter which is well suited for starting AC motors.

BACKGROUND OF THE INVENTION

DC-to-AC power converters are often used in uninterruptible power supplies. This is because one common method of storing back-up power is through the use of rechargeable batteries, which store and disburse power as DC energy. Correspondingly, when the main power source fails and the uninterruptible power supply provides back-up AC power from the battery supply, the stored DC energy needs to be converted into AC power.

Furthermore DC energy is often stored in the uninterruptible supply at voltage levels below the typical peak-to-peak line voltage levels of the main power supply. Correspondingly, when stored DC energy is converted into AC power the voltage level needs to be boosted or stepped up. One or more transformers are commonly used for boosting or stepping up the voltage level. At least one technique allows for varying the winding ratio of the primary and secondary windings for adjusting the voltage levels and/or the current levels.

In many instances uninterruptible power supplies provide back-up power for motors, one example being sump pump motors. During the start up time of a single phase motor, the torque required to initiate shaft rotation of the motor must exceed the torque demanded by the motor load. This causes the current in the motor winding to increase, in many instances, by a factor of 6 or 7 times the motor's rated current. Generally, this current exists for between 15 and 20 sixty hertz cycles, or between 250 ms and 333 ms. For power supplied by the local utility, this typically has no effect on the power quality.

However for switch mode power supplies, consistent with those used in uninterruptible power supplies, a large current draw from a motor starting can result in immediate shut down or damage to the power supply. Often drawing excessive current can result in the magnetics involved in the power conversion process to become magnetically saturated, causing them to lose inductance, thereby rendering them ineffective. Since most uninterruptible power supplies involve the use of transformers of some sort, which electrically isolate the input from the output, when the magnetics become saturated the output voltage falls to zero almost immediately.

Additional detrimental effects are further possible. When the core of the transformer has saturated, all of the magnetizing inductance is eliminated from the primary winding. As the output voltage decreases, due to the current draw of the motor, the control circuitry in the uninterruptible supply will typically respond by increasing the duty cycle or on time of the magnetics. However as the duty cycle increases and the inductance in the primary winding falls to zero, the current through the primary winding which is approximated by the equation $I_L=(V_L \times T_{ON})/L$ becomes very large and potentially damaging to the other circuit elements, like switching semiconductors.

Correspondingly, there is a continuing need for a DC-to-AC power converter circuit which is capable of handling large currents associated with starting a motor.

SUMMARY OF THE INVENTION

A system for generating an AC power output signal from a DC power input signal incorporates a DC-to-DC boost regulator including a plurality of boost stages coupled in series for receiving a DC input signal and producing a boosted DC power signal. The system further incorporates a DC-to-AC converter, coupled to the DC-to-DC boost regulator, for receiving the boosted DC power signal and generating an AC power output signal. A control element is coupled to both the DC-to-DC boost regulator and the DC-to-AC converter.

In one aspect of the invention, each of the plurality of boost stages includes push-pull drivers, a transformer and a charge storage element. The turning on and turning off of the drivers is controlled by the control element. When a respective driver is turned on, current and voltage are coupled via the transformer, rectified and charge accumulates on the charge storage element.

Where the load is an AC motor to be started, the required, starting current saturates the transformer(s) and the output peak-to-peak AC voltage begins to fall. Circuitry coupled to the secondary of the transformer(s) provides a minimum DC output voltage of a value on the order of the amplitude of the input battery voltage. The output AC peak-to-peak voltage, as a result, will drop only to twice the battery voltage.

As the motor begins to start, the load current diminishes and the transformer(s) come out of saturation. Once the transformer(s) come out of saturation, they begin functioning normally, boosted DC voltage increases and the peak-to-peak AC output voltage also increases toward its rated output value. As the motor speeds up, the required current will drop back to its steady-state nominal operating value.

In another aspect of the invention, the DC-to-AC converter includes a first pair of switches coupled in series between the boosted DC power signal and ground and having a first output terminal coupled between the first pair of switches. The DC-to-AC converter further includes a second pair of switches coupled in series between the boosted DC power signal and ground and having a second output terminal coupled between the second pair of switches.

The control element independently activates the switches in both the first pair of switches and the second pair of switches for producing an AC power output signal across the first and second terminal. Conversion processing can be carried out by pre-stored, executable instructions.

A method for generating an AC power output signal from a DC power input signal incorporates the steps of receiving a DC power input signal, boosting the DC power input signal for providing a boosted DC power signal. The boosted DC power signal can then be converted to an AC power output signal.

In at least one aspect of the invention the system and method for generating an AC power output signal from a DC power input signal are used in connection with an uninterruptible power supply.

These and other aspects and attributes of the present invention will become increasingly clear from the following detailed description of the invention and the embodiments thereof, from the claims, and from the accompanying drawings.

BRIEF DESCRIPTION OF THE DRAWINGS

FIG. 2 is a schematic diagram of one aspect of a boost stage for use in the system for generating an AC power output signal from a DC power input signal of FIG. 1 illustrating the current flow when the switching element is on;

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
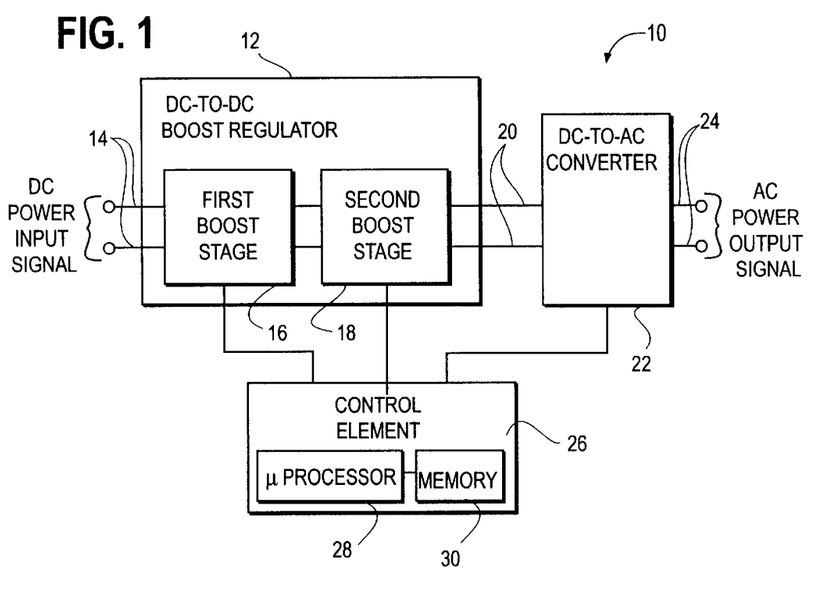
FIG. 1 is a block diagram of a system for generating an AC power output signal from a DC power input signal in accordance with the present invention.

FIG. 1 illustrates a block diagram of a system 10 for generating an AC power output signal from a DC power input signal which embodies the teachings of the present invention. The system 10 includes a transformerless DC-to-DC boost regulator 12, which includes input terminals 14 for receiving a DC power input signal. The DC-to-DC boost regulator 12 further includes a first boost stage 16 and a second boost stage 18 coupled in series. Additional boost stages coupled in series are further possible. At terminals 20, the output corresponding to the last boost stage 18, the DC-to-DC boost regulator 12 produces a boosted DC power signal.

In the preferred embodiment, the input terminals 14 receive DC power from a battery. The battery voltage has a range of 18VDC to 28VDC. The DC-to-DC boost regulator 12 produces a regulated output voltage of 135VDC at terminals 20.

The system 10 further includes a DC-to-AC converter 22 including output terminals 24 at which an AC power output signal is produced, coupled to the transformerless DC-to-DC boost regulator 12 for receiving the boosted DC power signal, and a control element 26. The control element 26 is coupled to each boost stage 16 and 18 of the transformerless DC-to-DC boost regulator 12, and the DC-to-AC converter 22, for monitoring output levels and operational status and producing control signals.

In at least one preferred embodiment the control element 26 includes a microprocessor 28 for executing a corresponding control program. Instructions for the program are stored in a memory 30, separate from or part of the microprocessor 28. In at least another preferred embodiment the control element 26 further includes separate controllers in addition to microprocessor 28. Separate controllers include pulse width modulator controllers for separately controlling each of the boost stages 16 and 18 of the transformerless DC-to-DC boost regulator 12, and pulse width modulator inverter output controllers for separately controlling the DC-to-AC converter 22, as well as corresponding gate drivers.

Figure 2:
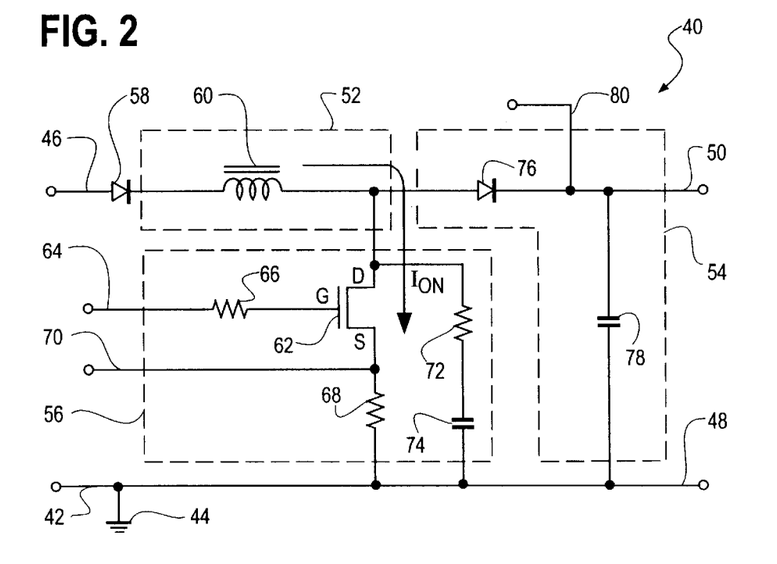
Figure 3:
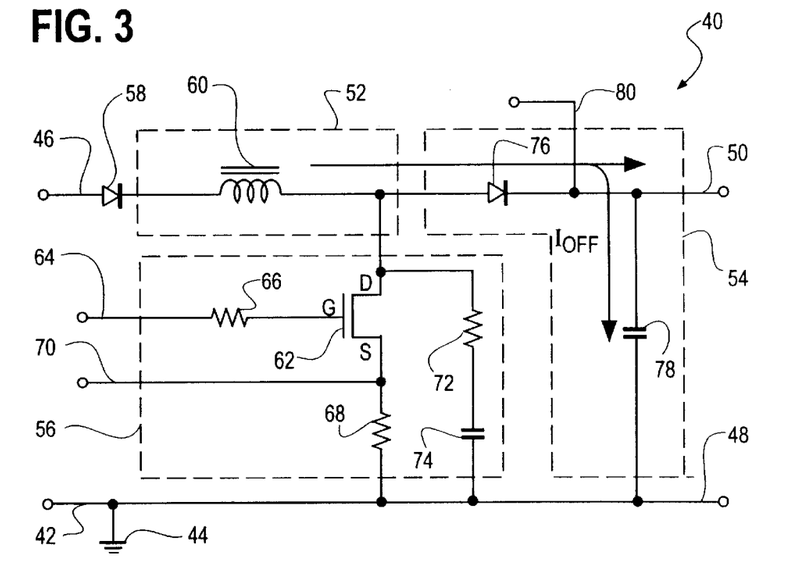
FIG. 3 is a schematic diagram of one aspect of a boost stage for use in the system for generating an AC power output signal from a DC power input signal of FIG. 1 illustrating the current flow shortly after the switching element is turned off.

FIGS. 2 and 3 illustrate a schematic diagram of one aspect of a boost stage 16 or 18 for use in the system 10 for generating an AC power output signal from a DC power input signal of FIG. 1. Specifically FIGS. 2 and 3 illustrate a current pump 40. The current pump 40 includes a pair of input terminals including a ground terminal 42 coupled to a common ground 44, and a DC input terminal 46, and a pair of output terminals including a ground terminal 48 coupled to the common ground 44 and a DC output terminal 50. The current pump 40 further includes an inductive element 52 coupled in series with a charge storage element 54 coupled in parallel with a switching element 56.

The DC input terminal 46 is coupled to the inductive element 52 via a diode 58. The anode of the diode is coupled to the DC input terminal 46. The cathode of the diode is coupled to the inductive element 52. This enables current to flow from the DC input terminal 46 to the inductive element 52, and blocks current from flowing in the reverse direction.

In the preferred embodiment, the inductive element 52 is an inductor 60, and more specifically a powdered-iron inductor.

The switching element 56 includes a transistor 62, and more specifically a MOSFET transistor. The transistor 62 operates as a switch, wherein the gate G of transistor 62 is coupled to the control signal input terminal 64 via resistor 66 for receiving a control signal for turning the transistor on and off. The control signal is generated by the control element 26. The drain D of transistor 62 is coupled to inductor 60. The source S of transistor 62 is coupled to ground 44 via resistor 68. Transistor 62 couples inductor 60 to ground 44, when transistor 62 is turned on.

The source S of transistor 62 is further coupled to a current feedback signal terminal 70. The current feedback signal terminal 70 provides a signal having a value corresponding to the voltage drop across resistor 68. In the preferred embodiment, the value of resistor 68 is on the order of a couple of milliohms, so as to minimize the voltage drop across the resistor 68, but large enough to produce a measurable voltage drop when switch 62 is on and conducting current. The current feedback signal terminal provides feedback to the control element 26.

The drain D of transistor 62 is further coupled to ground via resistor 72 in series with capacitor 74.

The charge storage element 54 includes a diode 76 coupled in series with capacitor 78. The diode 76 is arranged with its anode coupled to inductor 60 and the drain D of transistor 62. The cathode of diode 76 is coupled to a first terminal of capacitor 78. This enables current to flow from the inductor 60 to capacitor 78. The other terminal of capacitor 78 is coupled to ground 44. The cathode of diode 76 and the first terminal of capacitor 78 is further coupled to DC output terminal 50 and a voltage feedback terminal 80. The voltage feedback terminal 80 is coupled to the control element 26.

When the switching element 56 is turned on, current flows through the switching element 56 via the inductive element 52 and the DC input terminal 46. This is illustrated by arrow $I_{ON}$ in FIG. 2. The mean value of the current conducting through the inductive element 52 is proportional to the duration that the switching element 56 is turned on.

When the switching element 56 is turned off, the current flowing through the inductive element 52 is redirected into charge storage element 54, and more specifically capacitor 78, and any load coupled to DC output terminal 50. This is illustrated by arrows $I_{OFF}$ in FIG. 3. Because an inductive element 52 opposes changes in current, due to energy stored in its magnetic field, when the switching element 56 is turned off, the current continues to flow through the inductive element 52. The current needs to go somewhere. With the switch turned off the only available path for the current in the inductor is to flow into the charge storage element 54 and/or to supply a load attached to the DC output terminal 50. Correspondingly, the inductor current is injected into the charge storage element 54 and/or the load. The current produced in the inductor as a result of the energy stored in the magnetic field of the inductor enables the inductor current which flows into the charge storage element 54 to produce voltage levels which exceed the voltage level at the DC input terminal 46.

While saturation of the of the magnetics due to excessive currents, and the electrical isolation of the input and the output, would result in the output voltage falling to zero, in many prior systems using transformers, in the present system 10, even if the magnetics, i.e. inductive element 52, were to saturate and the magnetic field collapsed, the voltage at the DC output terminal 50 would only fall to the value of the voltage at the DC input terminal 46. This is because in the present configuration, in accordance with the present invention, the DC output terminal 50 is not electrically isolated from the DC input terminal. Even if the inductive element 52 fails, the current demanded by the load passes through the inductive element 52.

In the preferred embodiment the switching element is switched at a frequency of 32 kHz. However, other frequencies are also possible. In selecting the switching frequency at least two competing design considerations with offsetting benefits need to be evaluated and the corresponding trade-offs balanced. Higher frequencies enable the use of smaller magnetics as higher frequencies allow for smaller volt-second excursions within the magnetic core of the device. Smaller excursions produce smaller flux densities, which allow for the use of smaller cores. For an inductive element 52 not to saturate, the volt-second product of the on-time must be less than or equal to the volt-second product of the off-time.

While higher frequencies allow for the use of smaller magnetics, in the switching element, higher frequencies produce greater switching losses in the switching element 56. Alternatively, lower frequencies would require larger magnetics, but would produce reduced switching losses.

At a given switching frequency the value of the charge produced at the DC output terminal 50 can be adjusted by changing the ratio of the switching element's 56 on time to off time. This can be done by adjusting the duty cycle of the control signal for the switching element 56, and/or adjusting the time between when the switching element 56 is turned on and when the switching element 56 is turned off.

By monitoring the voltage level at the voltage feedback terminal 80, the charge stored in the charge storage element 54 can be compared to a predetermined charge or predetermined operating value. The control element 26 can then appropriately adjust the duty cycle of the switching element, and/or the time between when the switching element 56 is turned on and when the switching element 56 is turned off, to adjust the charge stored in the charge storage element 54 and the voltage level produced at the DC output terminal 50. The duty cycle for the boost stage 16 and 18 required for producing a desired output voltage from a given input voltage is defined by the equation: $D=(Vout-Vin)/Vout$.

In order to produce a regulated output voltage of 135VDC from an input voltage range of between 18VDC to 28VDC, in a single stage a duty cycle between 0.80 and 0.86 would be required. The charge stored in the charge storage element 54 is recharged during the off periods of the duty cycle.

Larger duty cycles have shorter off periods in which a larger current is injected into the charge storage element 54 in a shorter period of time. As a result larger duty cycles produce larger ripple currents at the DC output terminal 20.

In order to reduce the duty cycle and the corresponding ripple currents, in the preferred embodiment the DC-to-DC boost regulator 12 produces a boosted DC power signal in a plurality of boost stages 16 and 18. In the preferred embodiment a first boost stage 16 and a second boost stage 18 is used. Each boost stage 16 and 18, would produce a different output voltage. Correspondingly, the control element 26 would utilize a separate predetermined operating value for comparison with the voltage level at the voltage feedback terminal 80 for adjusting the duty cycle of the corresponding switching element 56. The operating value can correspond to a specific level or an acceptable range.

In the preferred embodiment, the first boost stage 16 receives an input voltage having a range between 18VDC to 28VDC and produces an output voltage of 74VDC. The second boost stage 18 receives an input voltage of 74VDC (the output voltage from the preceding boost stage 16) and produces an output voltage of 135VDC. As a result the duty cycle of the first boost stage 16 varies from 0.62 to 0.76. The duty cycle of the second boost stage 18 is 0.45.

It is noted that the present invention allows for the use of greater than two boost stages, which may be desirable for some applications.

Figure 4:
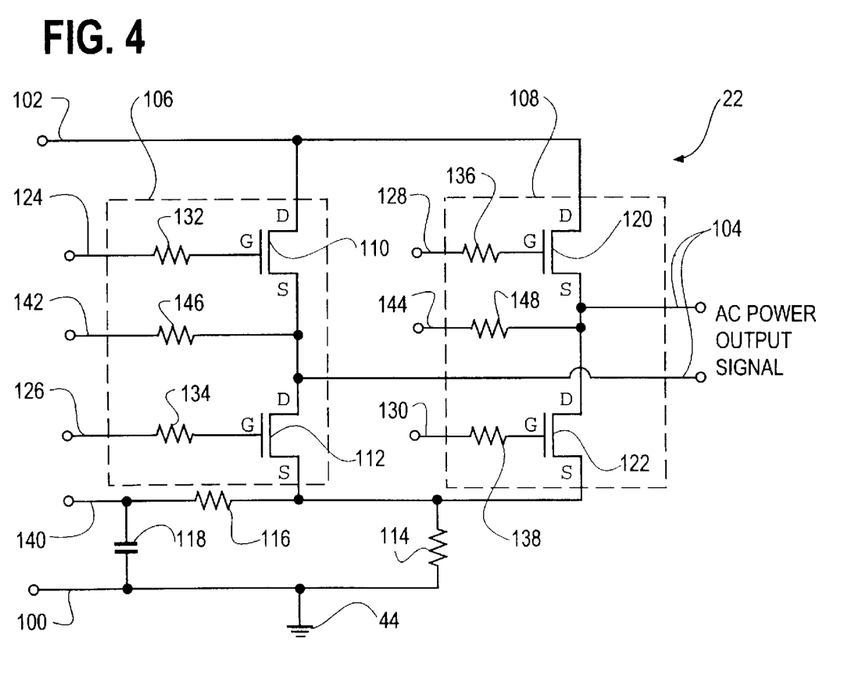
FIG. 4 is a schematic diagram of one aspect of a DC-to-AC converter for use in the system for generating an AC power output signal from a DC power input signal of FIG. 1.

FIG. 4 illustrates a schematic diagram of one aspect of a DC-to-AC converter 22 for use in the system 10 for generating an AC power output signal from a DC power input signal 20 of FIG. 1. The DC-to-AC converter 22 includes a pair of input terminals for receiving a boosted DC power signal including a ground terminal 100 coupled to ground 44, and a boosted DC power input terminal 102, and a pair of AC power output terminals 104. The DC-to-AC converter 22 further includes a first pair of switches 106 coupled between the boosted DC power input terminal 102, and ground 44, and a second pair of switches 108 similarly coupled between the boosted DC power input terminal 102 and ground 44 in parallel with the first pair of switches 106.

The first pair of switches 106 includes two MOSFET transistors, transistor 110 and transistor 112. The drain D of transistor 110 is coupled to the boosted DC power input terminal 102. The source S of transistor 110 is coupled to the drain D of transistor 112 and a corresponding one of the AC power output terminals 104. The source S of transistor 112 is coupled to ground 44 via resistor 114 in parallel with the series combination of resistor 116 and capacitor 118.

The second pair of switches 108, similar to the first pair of switches 106, includes two MOSFET transistors, transistor 120 and transistor 122. The drain D of transistor 120 is coupled to the boosted DC power input terminal 102. The source S of transistor 120 is coupled to the drain D of transistor 122 and a corresponding one of the AC power output terminals 104. The source S of transistor 122 is coupled to the source S of transistor 112, and similar to the source S of transistor 112, is coupled to ground 44 via resistor 114 in parallel with the series combination of resistor 116 and capacitor 118.

The gates G of transistors 110, 112, 120 and 122 are coupled to separate control input terminals 124, 126, 128 and 130 via corresponding resistors 132, 134, 136 and 138, for receiving separate control signals for activating each of transistors 110, 112, 120 and 122. The control signals are received from control element 26, shown in FIG. 1. By independently activating the transistors 110, 112 120,122 in each pair of transistors, an AC power output signal is produced across AC power output terminals 104.

A current feedback signal terminal 140 for the DC-to-AC converter 22 is coupled between resistor 116 and capacitor 118. The current feedback signal terminal 140 provides a signal having a value corresponding to the voltage drop across resistor 114. Similar to resistor 68 in current pump 40, the value of resistor 114 is on the order of a couple of milliohms, so as to minimize the voltage drop across the resistor 114, but still be sufficiently large to produce a measurable current drop at the appropriate current levels for providing feedback to the control element 26.

The control element further monitors the AC power output signal of the DC-to-AC converter 22 via a pair of sense terminals 142 and 144 coupled to corresponding AC power output terminals 104 via resistors 146 and 148.

Figure 5:
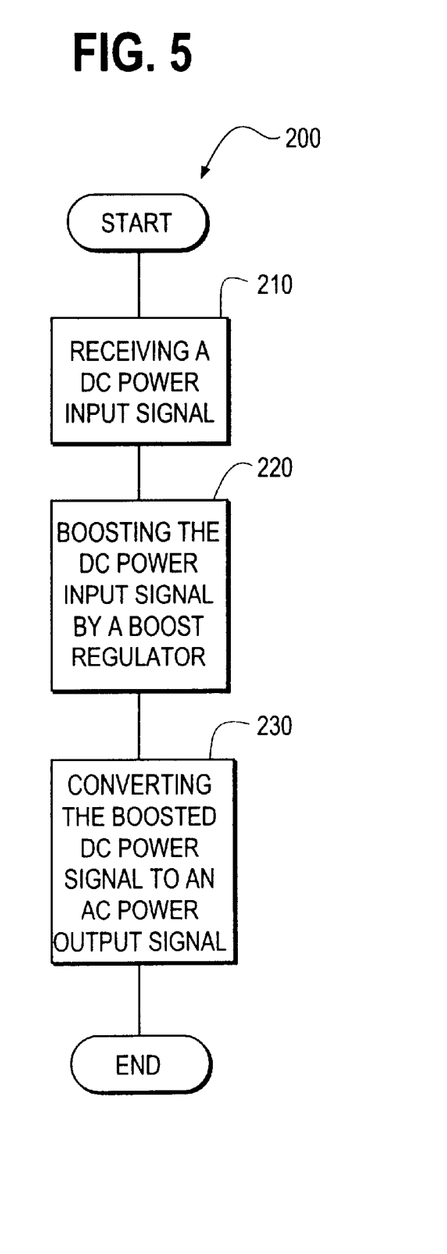
FIG. 5 is a flow diagram of a method for generating an AC power output signal from a DC power input signal for use with the system of FIGS. 1–4.

FIG. 5 illustrates a flow diagram of a method for generating an AC power output signal from a DC power input signal for use with the system of FIGS. 1–4. Generally the method includes the steps of receiving a DC power input signal 210, boosting the DC power input signal by a boost regulator 220, by a transformerless DC-to-DC boost regulator having a plurality of boost stages, and converting the boosted DC power signal to an AC power output signal 230.

Figure 6:
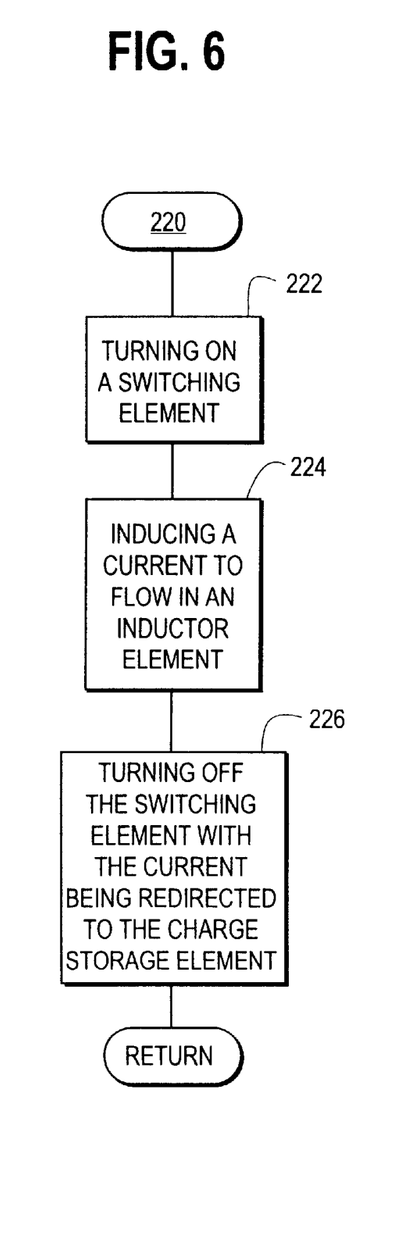
FIG. 6 is a flow diagram illustrating one example of more detailed steps for boosting the DC power input signal by a boost regulator for use in connection with the method of FIG. 5.

FIG. 6 illustrates a flow diagram illustrating one example of more detailed steps for boosting the DC power input signal by a boost regulator for use in connection with the method of FIG. 5. The more detailed steps for boosting the DC power input signal 220 includes the steps of turning on a switching element 222, inducing a current to flow in an inductor element 224, and turning off the switching element and redirecting the current to a charge storage element 226.

Figure 7:
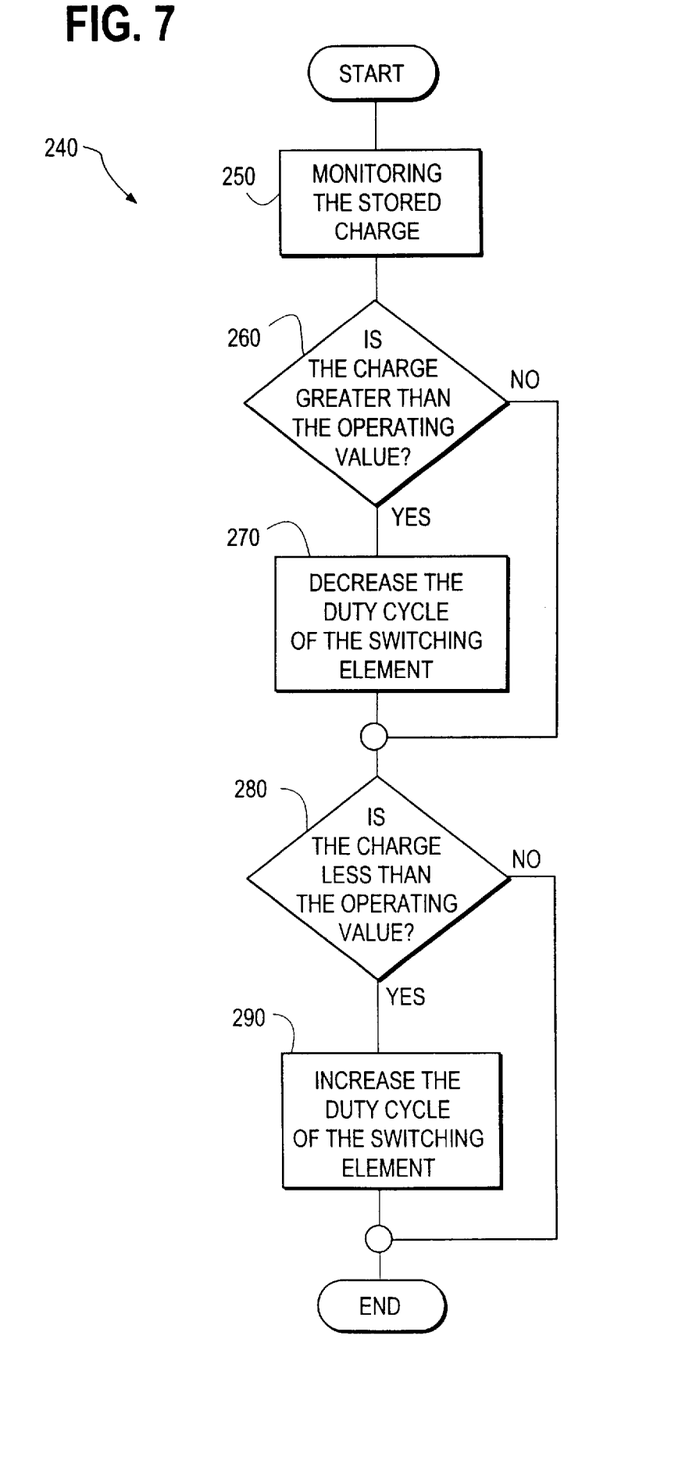
FIG. 7 is a flow diagram illustrating one example of steps for adjusting the duty cycle corresponding to the duration between when the switching element is turned on and the switching element is turned off.

FIG. 7 illustrates a flow diagram illustrating one example of steps for adjusting the duty cycle corresponding to the duration between when the switching element is turned on and the switching element is turned off 240. The steps for adjusting the duty cycle include monitoring the charge stored in a charge storage element 250. The monitored charge is then compared to a corresponding predetermined operating value.

If the monitored charge is greater than the operating value 260, then the duty cycle of the switching element is increased 270. If the monitored charge is less than the operating value 280, then the duty cycle of the switching element is decreased 290. As previously noted in connection with the current pump, FIG. 3, the predetermined operating value can correspond to a specific level or an acceptable range.

The sequence of steps for adjusting the duty cycle 240 can be executed either sequentially with respect to the method steps for generating an AC power output signal from a DC power input signal 200 or separately in parallel.

Figure 8:
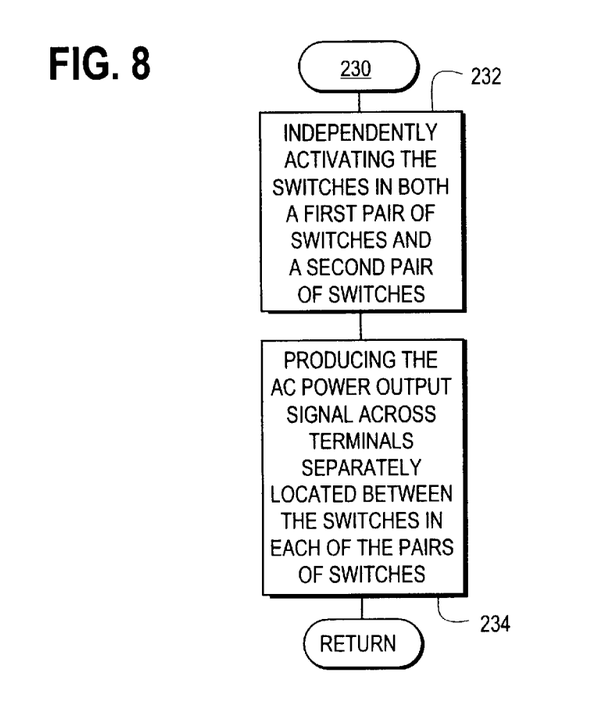
FIG. 8 is a flow diagram illustrating one example of more detailed steps for converting the boosted DC power signal to an AC power output signal for use in connection with the method of FIG. 5.

FIG. 8 is a flow diagram illustrating one example of more detailed steps for converting the boosted DC power signal to an AC power output signal 230 for use in connection with the method of FIG. 5. The more detailed steps for converting the boosted DC power signal to an AC power output signal 230 include independently activating the switches in both a first pair of switches and a second pair of switches 232, and producing the AC power output signal across terminals separately located between the switches in each of the pairs of switches.

The above described processing can be carried out by one or more sets of executable instructions. These instructions can be pre-loaded into storage or memory unit 30. It will be understood that various instruction sequences can be provided to implement the above processing without departing from the spirit and scope of the present invention.

Figure 9:
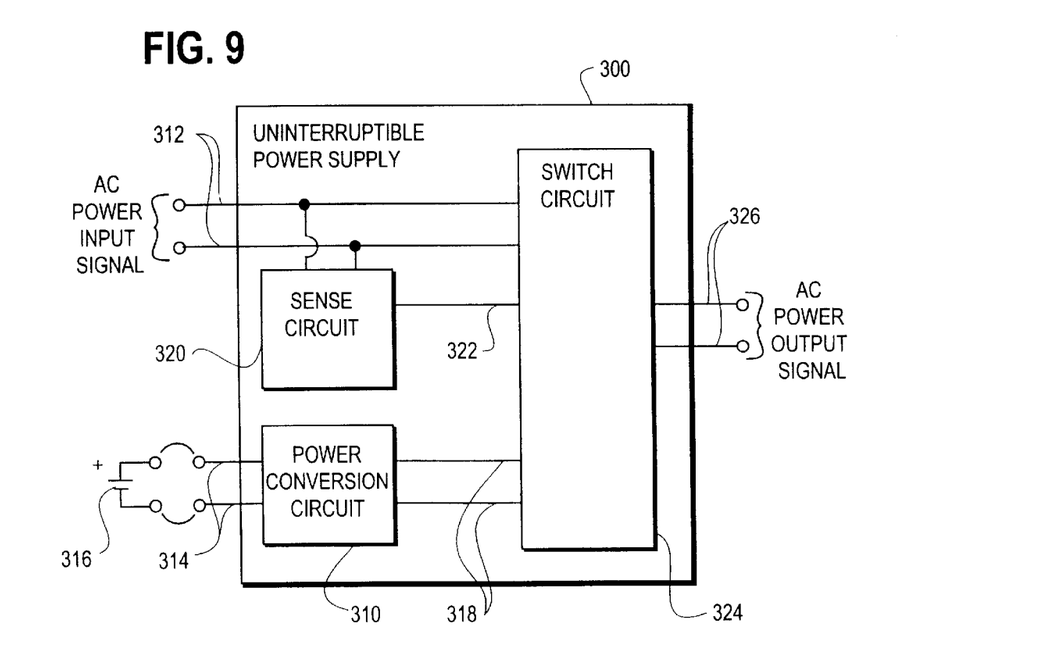
FIG. 9 is a block diagram illustrating one example of an uninterruptible power supply incorporating the system and method for generating an AC power output signal from a DC power input signal of FIGS. 1 and 5.

One example where the system 10 and method 200 for generating an AC power output signal from a DC power input signal are used, is in connection with an uninterruptible power supply. FIG. 9 is a block diagram illustrating one example of an uninterruptible power supply 300 including a power conversion circuit 310 incorporating the system 10 and method 200 for generating an AC power output signal from a DC power input signal of FIGS. 1 and 5.

The uninterruptible power supply 300 includes two sets of input terminals 312 and 314. The first set of input terminals 312 receives an AC power input signal. The second set of input terminals 314 receives a DC power input signal. In the preferred embodiment the AC power input signal corresponds to the AC power supplied by the local utility, and the DC power input signal is supplied by one or more rechargeable batteries 316, which may be separate from, or incorporated as part of the uninterruptible power supply 300.

The power conversion circuit 310 is coupled to the second set of input terminals 314 for receiving the DC power input signal. The power conversion circuit 310 further generates at terminals 318 a backup AC power output signal from the DC power input signal. Preferably the backup AC power output signal generated by the power conversion circuit 310 has signal characteristics consistent with the AC power normally supplied by the local utility and received at the first set of input terminals 312.

A sense circuit 320 is coupled to the first set of input terminals 312. The sense circuit 320 monitors the integrity of the AC power input signal received at the first set of input terminals 312, and produces a switch signal 322. The switch signal 322 is received by a switch circuit 324, coupled to the sense circuit 320. Dependent upon the monitored signal characteristics of the AC power input signal, and whether they are inside or outside acceptable operating parameters, the switch signal will be correspondingly adjusted.

Additionally coupled to the switch circuit 324 is the first set of input terminals 312 for receiving an AC power input signal, and terminals 318 for receiving the backup AC power output signal from the power conversion circuit 310. Dependent upon the value of the switch signal 322, received from the sense circuit 320, the switch circuit 324 alternatively couples the AC power input signal or the backup AC power output signal to a pair of AC power output terminals 326.

For example if the voltage level of the AC power input signal falls to zero, i.e. a utility power outage, or if the voltage level falls below a certain minimum acceptable level, i.e. a brown out, the sense circuit 320 produces a switch signal 322 causing the switch circuit 324 to switch to the backup AC power output signal, produced by the power conversion circuit 310. Other signal characteristics could be similarly monitored for producing an appropriate switch signal 322. Correspondingly, backup power can be provided at the AC power output terminals 326 of the uninterruptible power supply 300, in the event significant deviations are detected in the AC power input signal supplied by the local utility.

Figure 10:
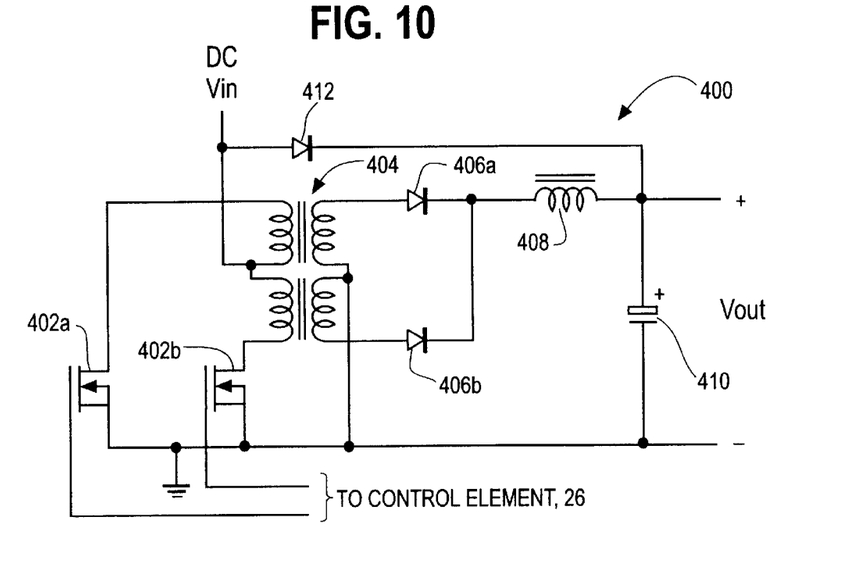
FIG. 10 is a schematic diagram of an alternate booster usable in the system of FIG. 1.

FIG. 10 is a schematic of an alternate form of a boost stage usable in the system of FIG. 1. The boost stage 400 of FIG. 10 incorporates a push-pull topology with two field effect switching transistors 402a and 402b. The transistors are in turn coupled to a primary of a center tapped transformer 404. The center tap on the primary side of the transformer 404, in an initial booster stage, such as stage 16 in FIG. 1, is coupled to the input DC battery voltage. In a multiple booster structure having a second boost stage, such as stage 18 in FIG. 1, the center tap of corresponding transformer 404 would be coupled back to the boosted DC output of the previous stage such as the stage 16.

As illustrated in FIG. 10, the boost stage 400 has a center tapped secondary which is coupled to system ground as well as rectifying diodes 406a and 406b. The cathodes of the diodes 406a, 406b are coupled to an input of an inductor 408. An output of the inductor 408 is coupled to capacitor 410.

A series pass diode 412 is coupled between the input DC battery voltage and the output voltage and capacitor 410. Date inputs to transistors 402a and 402b are coupled to and driven by control element 26.

Providing the diode 412, as illustrated in FIG. 10, prevents a loss in both DC and AC output voltage in the event that transformer 404 is saturated while trying to start an AC motor coupled as a load to the system. When the motor is stationery, it represents an extremely low impedance, which draws a very large starting current that may very well saturate transformer 404.

When the transformer 404 saturates the AC output voltage on lines 24 will start to fall. When the DC output voltage across capacitor 410 drops slightly below the amplitude of the input DC voltage, due to diode 412 becoming forward biased, the output voltage across capacitor 410 will be clamped to the value of the input DC voltage less the drop across the diode 412. As a result, the peak-to-peak AC output voltage, lines 24, will have a value on the order of twice the DC input battery voltage less two diode voltage drops.

In accordance with the boost circuit at 400 of FIG. 10, the necessary current required for the load will pass directly through the diode 412. As the motor picks up speed and moves toward a steady state mode of operation, its impedance will become significantly larger requiring less input current. The transformer 404 will at some point come out of saturation and the output voltage across capacitor 410 will start to increase reverse biasing diode 412. The AC voltage across lines 24 will increase to maximum nominal value and the motor should continue to operate in its steady state condition.

It should be noted that when the transformer 404 has become saturated, it no longer functions as an isolator. The input DC voltage is coupled via diode 412 directly to the output node at capacitor 410.

Figure 11:
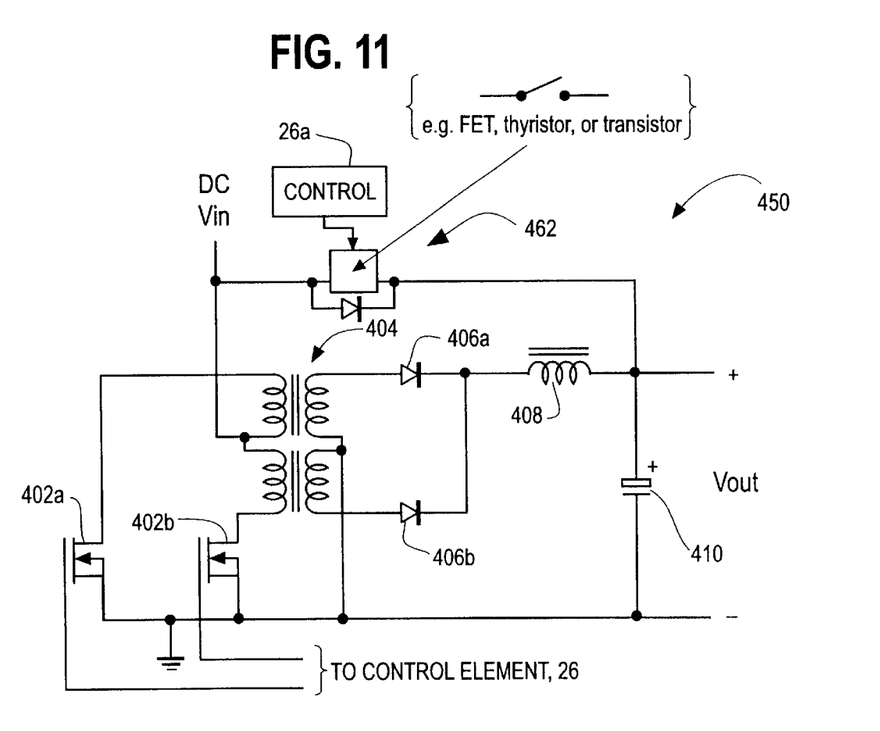
FIG. 11 is a schematic diagram of another alternate booster usable in the system of FIG. 1.

FIG. 11 illustrates a schematic of an alternate booster module 450 usable in the system 10 of FIG. 1. Elements of booster 450 which correspond to elements of booster 400 have been assigned the same identification numerals.

Unlike the booster 400 of FIG. 10, the booster 450 of FIG. 11 incorporates a switching transistor, generally indicated at 462 instead of a diode as a current steering element. A control circuit 26a coupled to the gate input of transistor 462 can be used to monitor the output voltage across capacitor 410 and the primary cite current.

During motor starting transient events, the circuit 26a can turn on the transistor 462 thereby permitting current to be diverted from the primary side of the transformer 404 to the output terminals across capacitor 410. When the transient starting current has fallen to its normal nominal operating value, the transistor 462 can be switched off. In this circumstance, once transistor 462 has been switched off, the boost circuit 450 increases the output voltage across the capacitor 410 as described above.

It will be understood that the current by-pass device, such as diode 412 or transistor 462 could, as an alternate, be coupled to the input of an output filter inductor so as to provide current limiting if desired. Where that output inductor might saturate the recovery process and method works as described above.

From the foregoing, it will be observed that numerous variations and modifications may be effected without departing from the spirit and scope of the invention. It is to be understood that no limitation with respect to the specific system illustrated herein is intended or should be inferred. It is, of course, intended to cover by the appended claims all such modifications as fall within the scope of the claims.

What is claimed:

1. A drive circuit for driving an inductive load with an AC-type output signal comprising:
   a transformer coupled DC boost circuit with an input for receipt of a DC input signal of a predetermined voltage and an output for a boosted DC signal;
   a bypass circuit coupled between the input and the output for bypassing the boost circuit in the event that the circuit's transformer saturates and for coupling the predetermined input DC voltage to the output.

2. A drive circuit as in claim 1 wherein the bypass circuit includes a three terminal switching element coupled between the input and the output.

3. A drive circuit as in claim 2 which includes a DC-to-AC converter with a DC input terminal coupled to the output for the boosted DC signal and a pair of AC outputs for coupling to an inductive load.

4. A drive circuit as in claim 3 wherein the converter comprises a transformerless bridge circuit whereupon, when an inductive load draws excessive currents saturating the transformer in the boost circuit, the peak-to-peak output AC voltage from the converter is on the order of twice the predetermined DC input voltage.

5. A drive circuit as in claim 2 wherein the switching element is selected from a class which includes a field effect transistor, a thyristor and a transistor.

6. A drive circuit as in claim 5 which includes a control circuit for activating the switching element.

7. A drive circuit as in claim 6 wherein the boost circuit comprises a center tapped transformer with first and second primary terminals coupled to respective first and second switches with the input coupled to the center tap.

8. A drive circuit as in claim 1 wherein the bypass circuit includes a diode coupled between the input and the output.

9. A drive circuit as in claim 8 wherein the boost circuit comprises a center tapped transformer with first and second primary terminals coupled to respective first and second switches with the input coupled to the center tap.

10. A drive circuit as in claim 8 which includes a DC-to-AC converter with a DC input terminal coupled to the output for the boosted DC signal and a pair of AC outputs for coupling to an inductive load.

11. A drive circuit as in claim 10 wherein the converter comprises a transformerless bridge circuit.

12. A drive circuit as in claim 11 which includes AC input terminals and a control circuit coupled thereto wherein the control circuit couples AC from the input terminals to the load and in the absence thereof, couples AC from the converter to the load.

13. A drive circuit as in claim 12 with at least one battery coupled to an input of the DC boost circuit.

14. A drive circuit as in claim 13 wherein the boost circuit includes a plurality of substantially identical series coupled boost circuits.

15. An uninterruptible power supply comprising:

AC input terminals for coupling to an AC utility-type supply;

DC terminals for coupling to a DC supply with a predetermined output voltage;

output AC terminals;

a boost circuit which incorporates at least one transformer with a by-pass circuit wherein the boost circuit is coupled to the DC terminals;

a transformerless DC-to-AC converter with inputs coupled to a DC output of the boost circuit and AC outputs; and a control circuit coupled to the AC input terminals, the output AC terminals and at least the AC outputs of the converter wherein the control circuit couples AC energy from the AC input terminals to the output AC terminals, and, in the absence thereof, couples AC energy from the AC outputs to the output AC terminals and in the presence of a load current which saturates the transformer, an output AC voltage on the order of twice the predetermined output voltage is coupled to the output AC terminals.

16. A power supply as in claim 15 wherein the boost circuit comprises a plurality of modules which have a substantially similar topology.

17. A power supply as in claim 16 wherein the by-pass circuit comprises at least one of a diode and a switching element.

18. A power supply as in claim 17 wherein the switching element in the by-pass circuit includes a control device and executable instructions.

* * * * *